Patented Nov. 6, 1945

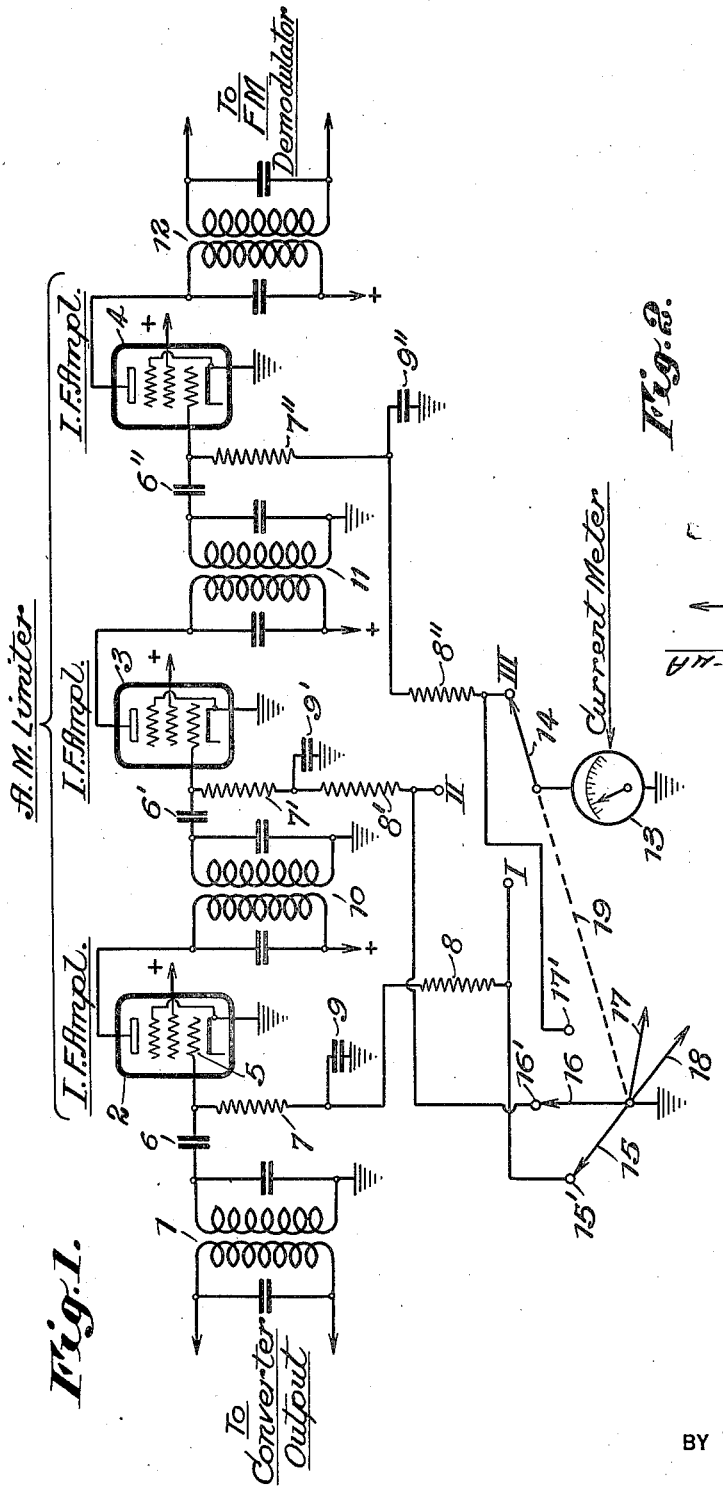

2,388,544

UNITED STATES PATENT OFFICE 2,388,544

FREQUENCY MODULATION RECEIVER INTENSITY INDICATOR

Paul F. G. Holst and Loren R. Kirkwood, Oaklyn, N. J., assignors to Radio Corporation of America, a corporation of Delaware Application December 2, 1941, Serial No. 421,286

1 Claim. (Cl. 250—20)

Our present invention relates to signal strength indicators for receivers of angular velocity-modulated carrier waves, and more particularly to a signal intensity indicator for frequency modulated carrier wave receivers which will indicate the strength of the signal carrier to which the receiver is tuned.

In amplitude-modulated carrier wave (AM) broadcast receivers it has often been found advantageous to utilize a diode as the second detector. The diode current has been used for automatic volume control action of the receiver. In such case, the diode current has often been employed to indicate the strength of the incoming carrier signal. Furthermore, in such amplitude modulation receivers, regardless of the construction of the automatic volume control circuit, it is readily possible to provide a signal strength indicator by merely having it respond to the direct currents, or potentials, produced by the second detector. However, in the case of receivers of angular velocity-modulated carrier waves, such as frequency-modulated carrier waves, automatic volume control, as known in AM receivers, is rarely employed. Furthermore, the usual second detector device is replaced by a so-called discriminator whose total output voltage is zero at resonance.

One of the main objects of our present invention is to provide in a receiver of angular velocity-modulated carrier waves a plurality of cascaded signal transmission stages simultaneously functioning as amplifiers and amplitude modulation limiters; there being utilized a current indicating device for indicating over a relatively wide range of signal intensities the signal strength at any instant, and there being associated with the indicating means a device which permits selective connection of the current indicator into any one of the aforesaid signal transmission stages.

Another important object of this invention is to provide a frequency modulated carrier wave (FM) receiver which has a plurality of cascaded intermediate frequency (IF) amplifier stages simultaneously functioning as amplitude modulation limiters, a visual current indicator being operatively associated with each of the IF stages, and means being provided for selectively connecting the visual indicator with the desired one of the IF stages thereby to permit indication of signal intensity over a wide intensity range.

Still another object of our invention is to improve generally the simplicity and efficiency of signal strength indicators for receivers of angular velocity-modulated carrier waves, and more especially to provide an FM receiver which includes a signal intensity indication means which is not only reliable and efficient in operation, but is economical of manufacture and assembly.

The novel features which we believe to be characteristic of our invention are set forth with particularity in the appended claim; the invention itself, however, as to both its organization and method of operation will best be understood by reference to the following description taken in connection with the drawing in which we have indicated diagrammatically a circuit organization whereby our invention may be carried into effect.

In the drawing:

Figure 1 shows a circuit diagram of the invention;

Figure 1A shows a modified embodiment of the indication meter switching mechanism;

Figure 2 graphically illustrates the operation of the indicating device.

Referring, now, to the accompanying drawing, wherein like reference characters in the different figures designate similar circuit elements, we have shown in Figure 1 only that portion of an FM receiver which is essential to a proper understanding of our present invention. Let it be assumed that the IF amplifier network shown herein is, by way of illustration, the IF amplifier network of the FM receiving system disclosed in our application Serial No. 421,900 filed December 6, 1941 patented January 16, 1945 as U. S. Patent No. 2,367,352. In that receiving system, the desired signal frequency band covers a range of 70.4 to 72.6 megacycles (mc.). The IF value, that is the center frequency of the FM waves reduced to the IF, is 5 mc. The channel width of the received FM waves may be of the order of 150 kilocycles (kc.). Of course, the invention is not limited to these various frequency values, since the carrier frequency deviation ratio may be small or high depending upon the desires of the transmitter and receiver set designer.

Assuming, however, that each of the IF intertube networks has a pass band width of 150 kc., the IF transformer I will have its primary and secondary circuits each tuned to $F_c$, which, in this case, would be the operating IF value (5 mc.). The primary and secondary circuits would be coupled to pass the entire frequency swing of the IF carrier. It will be understood that the primary circuit of the transformer I is connected in the output circuit of the first detector, or converter, stage of an FM superheterodyne receiver. It is, also, to be clearly understood that, while reference is made herein to FM reception, the system is equally useful in connection with the reception of phase-modulated carrier waves. The generic term "angular velocity-modulated carrier waves" is used herein to include both of these forms of modulation.

Each of the IF amplifier tubes may be pentodes of the 6SH7 type. The IF amplifier tubes 2, 3 and 4 are arranged in cascade, and the circuits thereof are substantially similar in construction. Therefore, a specific description will be given only in connection with one of the IF amplifier stages, it being understood that each of the other IF amplifier stages are exactly the same in construction.

Referring, then, to the IF amplifier tube 2, its cathode is at ground potential. Its input grid 5 is connected to the high alternating potential side of the secondary circuit of transformer 1 through the IF coupling condenser 6. The low potential side of the secondary circuit of transformer 1 is grounded. The grid side of the condenser 6 is connected to a contact point I through a path which includes the series resistors 7 and 8. The junction of the resistors 7 and 8 is connected to ground through a condenser 9. Resistors 7 and 8 may have magnitudes of 0.22 megohm and 1,000 ohms, respectively. The plate of the tube 2 is connected to a source of positive potential through the coil of the primary circuit of the IF transformer 10.

In the second IF amplifier stage, the tube 3, has its control grid connected to contact point II through the series resistors 7' and 8'. The control grid is coupled to the high alternating potential side of the resonant input circuit of tube 3 through the IF coupling condenser 6'. Similarly, the third IF amplifier tube 4, has its control grid connected to contact point III through the series resistors 7" and 8". The IF coupling condenser 6" connects the control grid of tube 4 to the high alternating potential side of the resonant input circuit of tube 4.

It will be clearly understood that each of the primary and secondary circuits of transformers 1, 10, 11 and 12 is tuned to the operating IF value, and that each of the transformers is designed to pass a band of approximately 150 kc. in width. The secondary circuit of transformer 12 may be coupled to an FM demodulator network of any desired type, as, for example, that shown in our aforesaid application. The demodulated signals will, of course, be amplified, and then reproduced in any suitable reproducer.

The signal strength indicating device may be a current meter which is schematically represented by number 13. One of the terminals of the meter is established at ground potential, while the other terminal is connected to an adjustable, or mobile, arm 14. It will be understood that adjustable element 14 may be connected with any of the contacts I, II or III. A second adjustable device is provided, and comprises a plurality of arms 15, 16, 17 and 18. It will be understood that the spacing between these arms 15, 16, 17 and 18 is maintained fixed. In other words, these four arms are moved as a common unit. They cooperate with contact points 15', 16' and 17'. The junction of the four arms 15 to 18 inclusive is maintained at ground potential. Furthermore, the dotted line 19 designates a mechanical unicontrol mechanism which may be arranged for operating the unit 15—18 concurrently with the adjustable arm 14.

The lower end of resistor 8 is connected to contact 15'. The lower end of resistor 8' is connected to contact 16'; and the lower end of resistor 8" is connected to contact 17'. It will, therefore, be seen as shown in Figure 1 that when the arm 14 is in electrical contact with point III, then the arms 15 and 16 are in electrical contact with points 15' and 16' respectively. In other words, the grid resistors of amplifier tubes 2 and 3 are in such case connected directly to ground, whereas the grid resistors of amplifier 4 are connected to ground through the current meter 13. This, of course, means that current meter 13 will indicate only the grid current flowing through the grid circuit of amplifier tube 4. Similarly, when mechanism 19 is actuated to adjust arm 14 to make electrical contact with point II, the arm 16 will make electrical contact with point 15'. The arm 17 will make electrical contact with point 17'. It will, therefore, be seen that in this position of the switching mechanism 19 the meter 13 is in circuit to indicate the grid current flow in the grid circuit of tube 3, whereas the grid circuits of tubes 2 and 4 are grounded.

The cascaded stages including tubes 2, 3 and 4 provide an AM limiter network. Briefly, the function of the limiter is to eliminate AM effects which may exist on the FM carrier, and which effects are caused by virtue of noise, impulses, fading, and also by virtue of the passage of the signal waves through the cascaded resonant circuits prior to the demodulator. Limiters, also function as an AVC (automatic volume control) device. Limiters used in FM receivers are often of the "grid leak limiter" type; that is the amplifier tube, which is usually an IF amplifier, is of a readily overloaded type. For example, the cathode of the amplifier is grounded, while the control grid is connected to the input circuit by a grid condenser, the grid being connected to ground through a grid leak resistor.

As the input voltage to such a grid leak type of limiter is raised, the direct current voltage on the control grid of the amplifier tube increases, and thereby automatically tends to lower the output current of the tube. By proper design of the associated circuits, it is possible to maintain the output substantially constant when the signal input voltage is raised above a certain minimum value. However, the grid current flowing through the grid leak resistor of the limiter tube increases with increasing signal strength. In other words, although the input-output characteristic has a rising portion up to a predetermined carrier amplitude, and a substantially horizontal portion thereafter, yet the grid current flow through the grid leak resistor keeps increasing above the aforesaid predetermined carrier amplitude value. This increase is maintained until grid current reaches a value at which the preceding amplifier tube begins to limit.

It has been found that a good design of a limiter as described will maintain the output constant over a range of signal input of approximately 40 db. (decibels). In order to permit input variations over a greater range of signal input voltage, all the stages in the IF amplifier network are made to function as limiters. In other words, the grid condenser-grid leak resistor combination 6—7 of each of the IF amplifier stages functions to provide AM limiting action at different values of signal input voltage. It will now be seen that the entire network between the converter output circuit and the FM demodulator functions as an AM limiter, the limiting action being staggered. Simultaneously, these limiter stages function as IF amplifiers. The current meter 13 is selectively inserted in either of the three IF amplifier grid circuits, and the grid circuits which are not utilized are short-circuited to ground in order to permit them to function properly. This enables the set operator to measure at will the grid current flow in each of the grid circuits. By way of illustration, condensers 6, 6' and 6'' may each have a value of 33 mmf. (micromicrofarads), while each of resistors 7, 7' and 7'' may have a value of 220,000 ohms.

In Figure 2, there is shown the relation between micro-volt input at the antenna of the receiving system, and grid current flow in each of the IF amplifier-limiter stages. The curves denoted as I, II and III indicate the grid current flow through the current meter when the arm 14 is adjusted for contact with the contact points I, II and III, respectively. It will be seen that the strength of signal applied to the antenna input terminal of the receiver may be calibrated directly against the grid current flow in each of the IF amplifier stages. The resistors 8, 8' and 8'', in conjunction with each of the condensers 9, 9' and 9'', respectively, function as IF filter networks.

It is believed that the operation of the mechanism will be clear from the aforesaid description. It will be noted that grid current flows in th third IF amplifier stage for smaller microvolt input values than in the first IF amplifier stage. Hence, when the switching mechanism is actuated to indicate the grid current flow in the grid circuit of the third IF amplifier tube 4, that will be the adjustment for indicating weak signal strength. On the other hand, when the current-indicating device is in circuit solely with the grid circuit of the first IF amplifier tube 2, then it will be able to provide an indication of a relatively high field strength. Curve III of Figure 2 indicates a weak signal intensity, while curve I indicates a strong signal.

In Figure 1A, there is shown a simplified mechanical switch mechanism which can be utilized in place of the three position switching mechanism shown in Figure 1. The simplified switching mechanism comprises a split ring device of sections 30 and 31. The indicating meter 13 is connected between ground and one wiper, or contact, element 32. The contact points I, II and III are connected respectively to wiper elements 33, 34 and 35. An auxiliary wiper element 34' is also connected to contact point II. This wiper acts to connect the grid circuit of amplifier 3 to ground in the extreme clockwise position of 31—30. In addition, a grounded wiper element 40 is provided. The wipers are all resilient. It will now be seen that, when the rotatable switching mechanism 31—30 is in the position shown (extreme counter-clockwise), the indicating meter is in circuit with the grid circuit of the third IF amplifier tube.

It will be noted that the grid circuits of the first two amplifier tubes are connected to ground by virtue of the fact that the wiper elements 40, 33 and 34 are in electrical connection with the metallic ring section 31. It will be clear that proper rotation of the switching ring will connect the indicating device 13 in circuit with either of the grid circuits of the first or second IF amplifiers, while connecting the grid circuits of the non-selected amplifiers to ground.

While we have indicated and described a system for carrying our invention into effect, it will be apparent to one skilled in the art that our invention is by no means limited to the particular organization shown and described, but that many modifications may be made without departing from the scope of our invention, as set forth in the appended claim.

What we claim is:

In combination with a source of frequency modulated carrier waves, a plurality of amplifier tubes arranged in cascade, each of said amplifier tubes including a grid condenser-leak resistor network for providing limiting therein, a current indication means, a first means for selectively connecting said current indication means to a desired one of said grid leak resistors thereby to indicate grid current flow therethrough, a second means connecting the grid leak resistors of the remaining amplifier tubes to a point of relatively fixed potential thereby to prevent grid current flow in said remaining amplifier tubes from affecting said current indication device and a common actuating means for concurrently operating said first and second means.

PAUL. F. G. HOLST.
LOREN R. KIRKWOOD.